United States Patent [19]

Girone et al.

[11] Patent Number: 4,599,890
[45] Date of Patent: Jul. 15, 1986

[54] HYDROSTATIC TEST APPARATUS

[75] Inventors: Joseph M. Girone, Bon Air; F. Wesley Dolezal, Chesterfield, both of Va.

[73] Assignee: Process Engineering Incorporated, Richmond, Va.

[21] Appl. No.: 647,521

[22] Filed: Sep. 5, 1984

[51] Int. Cl.[4] ............................................. G01M 3/28
[52] U.S. Cl. .......................................... 73/37; 73/49.5
[58] Field of Search ..................... 73/37, 40, 49.5, 49.1

[56] References Cited

U.S. PATENT DOCUMENTS

| | | | |
|---|---|---|---|
| 2,633,739 | 4/1953 | Potts et al. | 73/49.5 |
| 3,100,986 | 8/1963 | Starr et al. | 73/40 |
| 3,362,225 | 1/1968 | Noble | 73/49.1 |
| 4,103,537 | 8/1978 | Victor | 73/40.5 R |
| 4,114,426 | 9/1978 | McLean | 73/40.5 R |
| 4,167,868 | 9/1979 | Bobo et al. | 73/49.5 |
| 4,417,465 | 11/1983 | Noe et al. | 73/49.5 |
| 4,430,887 | 2/1984 | Roberts et al. | 73/49.5 |

FOREIGN PATENT DOCUMENTS 2838355  3/1980  Fed. Rep. of Germany ....... 73/49.5

OTHER PUBLICATIONS

Leo O'Campo—"Portable Hose Testing Device" Jan., 1984 *Fire Engineering*, pp. 24–25.

*Primary Examiner*—Jerry W. Myracle
*Assistant Examiner*—Hezron E. Williams
*Attorney, Agent, or Firm*—Hughes & Cassidy

[57] ABSTRACT

Hydrostatic test apparatus for pressure testing fire hoses, pressure vessels such as fire extinguishers, or the like, including a small, portable unit having an inlet line for connection to a hose from an ordinary water tap, for example, an outlet line connected to the item to be tested, a pump, a first bypass line between the inlet lines for filling the item being tested, a control valve in the first bypass line which is closed during testing to prevent backflow of test pressure into the water supply, a pressure gauge in the outlet line for reading test pressure, and an adjustable relief valve in a second bypass line between the inlet and outlet lines for setting a predetermined test pressure. Air vents or bleeds allow the apparatus to be completely bled of air before testing to assure accuracy of the test pressure readings. The apparatus operates on very low water volume for safety.

7 Claims, 2 Drawing Figures

HYDROSTATIC TEST APPARATUS

BACKGROUND OF THE INVENTION

This invention relates to hydrostatic testing devices and, more particularly, to an improved hydrostatic test apparatus for pressure testing fire hoses and the like, and pressure vessels such as fire extinguishers. The invention provides a compact, portable and inexpensive test apparatus which may be operated by a single individual and is very safe in use as it operates on very low volumes of water. Use of this invention for testing fire hoses and the like eliminates the necessity of using a standard pumper truck for hose testing purposes, an operation which is both expensive and dangerous.

Ordinarily, regulations in most areas require fire stations to pressure test new hoses before they are put into service and to test all hoses periodically, at least once a year, and in many cases, twice a year. On average, each fire company has 50 to 65 sections of hose which are from 1½ inches to 5 inches in diameter. These hoses are stored in the bed of each pumper truck and are coupled together, ready for use, or stored in storage racks. When testing is required, the station pumper truck is used to pressure test the fire hose. This is an expensive operation because the better part of a day is required if all hoses are checked at one time and the assistance of all station personnel is necessary to accomplish the task. This means that the station is out of service and adjacent stations must be assigned to cover the out of service station's territory. Due to the relatively high pressures required for testing hose, the pumper truck used may be damaged and repairs may prove to be very expensive; ordinarily, a new pumper truck costs as much as $200,000.

Other problems encountered in using a pumper truck to test hose are manifold. New hose is tested at about 300 PSI in order to ensure that the hose meets specifications. Old hose and new hoses which are 4 or 5 inches in diameter are pressure tested at 250 PSI. A pumper truck has a centrifugal pump which is adapted for moving large volumes and not for hydrostatic loading. A static, overload condition creates excessive heat resulting in unneccessary pump wear and stress to the pumper truck's drive system. There is also the cost of fuel to be considered because the pump runs off the engine. Standard pumper truck pumps are single or two stage pumps which require very high speeds to reach the test pressures of 250-300 PSI. For example, a pumper is designed to deliver 50% of its capacity at 250 PSI. When test pressures of 300 PSI are required, against deadhead conditions, the pump is drastically overworked.

Attempts have been made in the past to provide testing devices for pressure testing fire hoses which do not require the use of the station's pumper truck. U.S. Pat. No. 3,362,225 issued to M. A. Noble is directed to such a pressure testing device. The unit has a dual piston water pressure operated pump and sequencing valves. Water under pressure may be supplied from a hose connected to an ordinary water tap. The pistons continue to raise pressure in the hose to be tested until the desired pressure of 200 PSI to 600 PSI is reached, as indicated on a pressure gauge. The pump is stopped by shutting off the water supply from the tap. Pressure is maintained as long as desired to complete the testing procedure. Thereafter, water is drained from the apparatus and the hose being tested is disconnected. This device is complex and requires special, customized components made for the unit. Additionally, no means are disclosed for purging air from the test device. Air in the test device or hose being tested presents an obvious danger, in case of hose rupture during the test, and the test results will be inaccurate because air entrained into the system will be compressed, thus resulting in erroneous test pressure readings.

U.S. Pat. No. 4,103,537 issued to F. R. Victor discloses a portable pressure testing apparatus for water mains or the like including a motor, a pump driven by the motor, flow control valving, a relief valve and a pressure gauge. A bleeder valve and container are provided for measuring leakage in the main being tested. However, the apparatus disclosed includes no air venting arrangement of the type employed in this invention. Additionally, no bypass line with a pressure relief valve is disclosed which would provide for constant pressures once the system is filled.

Another known device includes a manifold arrangement for testing multiple lengths of hoses simultaneously. A water inlet valve is provided and a bleeder valve is included to bleed air from the system. A source of air under pressure must be provided together with an air pressure gauge in order to test the hoses. The principal difficulties with this system are that erroneous pressure readings result because air is used to pressurize the system and the air becomes entrained in the water filling the system and is compressed. Additionally, an expensive compressor or source of high pressure air is required to operate this testing device.

SUMMARY OF THE INVENTION

In direct contradistinction to the prior art devices, the present invention provides a very small, portable hydrostatic test apparatus including a small motor and a positive displacement pump mounted on a metal base provided with carrying handles so that the entire apparatus is portable. The pump is connected to a manifold pipe and valve assembly including a first bypass for filling the item to be tested from an external, positive pressure water source and a second bypass creating a closed loop during testing, the loop including an adjustable pressure relief valve so that excess pressure may be relieved from the test pressure side of the apparatus without any danger of introducing air into the system.

Accordingly, it is a principal object of the invention to provide a small, compact and portable hydrostatic test apparatus for testing a length of hose, a pressure vessel such as a fire extinguisher, or similar equipment including a bypass system which assures reliable, accurate pressure readings during testing and prevents any air from entering the system during pressure testing.

It is another object of the invention to provide a compact, hydrostatic test apparatus for fire hoses and the like which eliminates the need for using a standard pumper truck to test hoses, this being an expensive and potentially dangerous operation.

It is a further object of the invention to provide a small, compact hydrostatic test apparatus for pressure testing fire hoses or the like which is safe in use in that only low volumes of water are employed, thereby eliminating the possibility of the ends of hoses whipping during testing or expelling great quantities of water under pressure should the hose being tested rupture during the test.

It is yet another object of the invention to provide a compact hydrostatic test apparatus for pressure testing hoses or the like which utilizes stock, off the shelf components, thereby providing an apparatus which is low in cost of manufacture and inexpensive to maintain.

It is yet a further object of the invention to provide a hydrostatic test apparatus for pressure testing hoses or the like which may be operated by a single individual, thereby greatly reducing the costs and inconvenience attendant to hose pressure testing.

Generally speaking, the present invention includes a platform or base equipped with handles and an electric motor, a small pump driven by the motor and a manifold pipe and valve arrangement, all mounted on the base. The manifold pipe and valving arrangement includes an inlet port, to which may be connected a source of water under pressure, such as an ordinary garden hose from a water tap, an inlet line from the inlet port to the pump, and an outlet line from the pump to a connector, to which is attached a hose or the like which is to be tested. A first bypass line interconnects the inlet line and outlet line and is provided with a control valve; this bypass line is used to fill the system and the item to be tested. A second bypass line, interposed between the first bypass line and the pump, includes an adjustable relief valve for venting pressure during testing while simultaneously preventing the entry of any air into the system during a test procedure. A pressure gauge is included in the outlet line for the accurate determination of test pressure in the system. An air vent in the form of a bleed valve is located adjacent the gauge, above the other components of the apparatus so as to assure that all air is bled from the system prior to conducting a pressure test procedure. When a length of hose is being pressure tested, the open end of the length of hose may be provided with an air vent cap or standard fire nozzle which may be cracked or opened slightly to make sure air is bled prior to the test. Backflow test valves are provided in both the inlet and outlet lines of the apparatus.

Further novel features and other objects and advantages of this invention will become apparent from the following detailed description, discussion and the appended claims taken in conjunction with the accompnaying drawings.

BRIEF DESCRIPTION OF THE DRAWINGS

A preferred structural embodiment of this invention is disclosed in the accompanying drawing in which.

DESCRIPTION OF THE PREFERRED EMBODIMENTS

Figure 1:
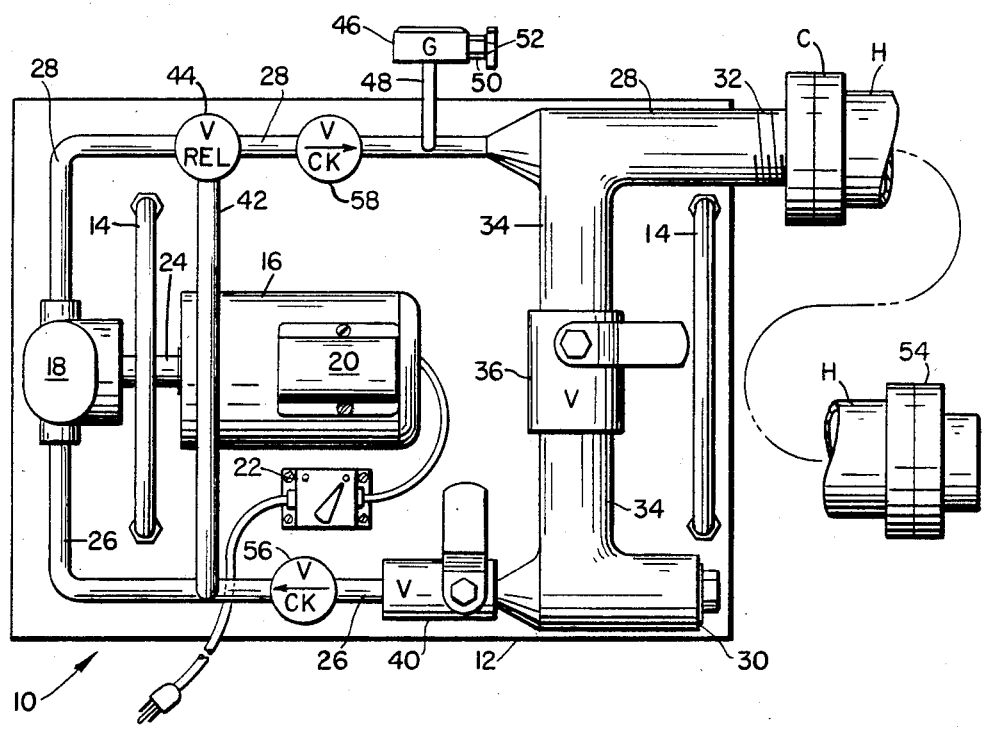
FIG. 1 is a top, plan diagrammatic view of the invention.

Referring now to the drawings by reference character, hydrostatic test apparatus 10 is shown including a base 12 and a pair of handles 14,14 at each end of the base 12. A prime mover in the form of a small electric motor 16 is mounted on base 12 and drives an equally small, positive displacement pump 18. Preferably, motor 16 is a fractional horsepower, capacitance starter type electric motor which is operable from a standard, 110 VAC source. The starter is illustrated at 20 and an "on-off" switch is illustrated at 22. A ¾ horsepower, 1750 rpm motor is quite suitable for the purposes of this invention. Pump 18 is driven from the output shaft 24 of motor 16. In the preferred embodiment of the invention, the pump is a dual piston, positive displacement pump having built-in inlet and outlet check valves (not shown). The pump operates at 2 GPM and 500 PSI.

The manifold pipe and valve arrangement of the invention includes an inlet line 26 and an outlet line 28. Inlet line 26 includes a 1½ inch connector 30 which is conveniently connected to a source of water under pressure. If desired, a standard adapter (not shown) may be provided so that connection 30 may be attached to a garden hose, for example, which in turn is connected to an ordinary water tap. The outlet side of outlet line 28 is also 1½ inches in diameter and is threaded at 32 to accept the coupling C of a length of hose H which is to be tested. The reason for the 1½ inch diameter dimensions at the end of the inlet and outlet lines, respectively, is that this particular size seems to be most convenient for most fire companies. Hose diameters and coupling threadings vary widely and, for this reason, most fire companies stock a wide variety of adapters. Experience has shown that a 1½ inch pipe thread will accept almost all of the available adapters. In another embodiment of the invention, the outlet end of outlet line 28 may be expanded to 2½ inches in diameter, as may be required by the purchaser.

Figure 2:
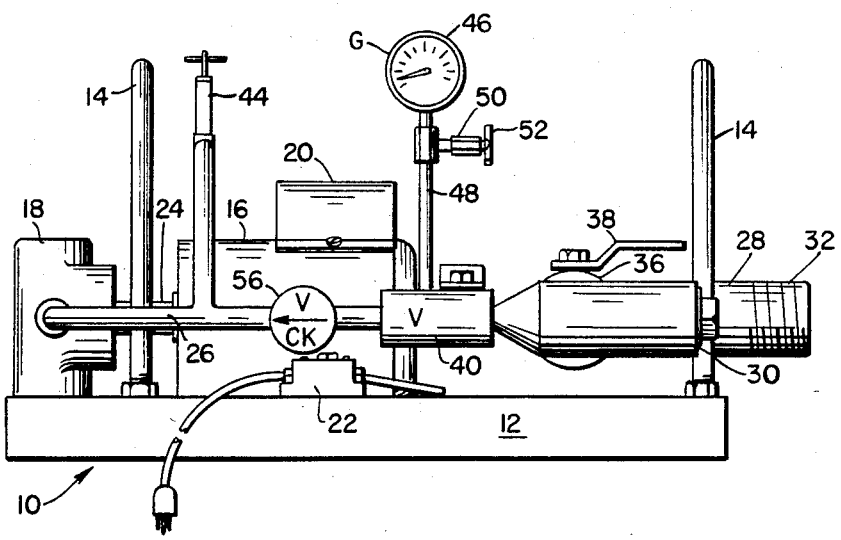
FIG. 2 is a side elevation, largely diagrammatic view of the invention as shown in FIG. 1.

Between those portions of the inlet and outlet lines farthest removed from pump 18 is interposed a first bypass line 34 which also may be 1½ inches in diameter so that the length of hose or the like being tested may be filled rather rapidly. First bypass line 34 includes a control valve 36 which may be an otherwise conventional ball valve, manually operable by means of a handle 38 (FIG. 2).

A second control valve 40 is provided in inlet line 26, upstream of the first bypass line 34. Control valve 40 may be a standard valve, the same as valve 36, only smaller in size.

A second bypass line 42 interconnects inlet line 26 and outlet line 28, between first bypass line 34 and the pump 18. Second bypass line 42 also includes an adjustable relief valve 44 which controls the testing pressure. In a preferred embodiment, adjustable relief valve 44 has a range of from 200 PSI to 500 PSI so that any one of a number of needed pressure levels may be established for the testing of fire hose. For example, new fire hose is usually tested at 300 PSI. Used hose and hose which is 4 or 5 inches in diameter are ordinarily tested at 250 PSI. If desired, relief valve 44 may be adjustable within a range of 50 PSI to 200 PSI for the testing of fire extinguishers or the like, which are commonly tested at pressure levels up to a maximum of 200 PSI. In other words, valve 44 may be replaced with another valve of lower pressure rating or, if desired, the spring within otherwise conventional valve 44 may be replaced with a smaller spring, to provide the lower adjustment range just discussed.

A pressure gauge 46 is connected to outlet line 28, between first bypass line 34 and second bypass line 42. In a preferred embodiment of the invention, pressure gauge 46 is a glycerine filled gauge. A sealed, glycerine filled gauge is preferred to the ordinary gauge to avoid pulsating and the attendant maintenance problems ordinarily associated with water filled gauges. At the upper end of the pipe section 48 interconnecting gauge 46 and outlet line 28 is a T fitting 50 having a bleed valve 52 thereon. As can be seen in FIG. 2, T fitting 50 and bleed valve 52 are located above the remaining components of the apparatus. This is done because, when the system is being filled with water for a pressure test, entrapped air will ordinarily rise to the highest point in the system.

Thus, the location of bleed valve 52 above the remaining components of the apparatus assures that all air will be bled from the lines prior to a test procedure. An air vent cap 54 is provided on the end of the length of hose H being tested for further assurance that air will be bled from the system prior to a pressure test. During filling, the vent cap 54, which is otherwise conventional, is cracked until only water flows out of the cap. On the other hand, a common fire nozzle might be used in place of the vent cap 54 to accomplish the same purpose.

Check valves 56 and 58 are provided in inlet line 26 and outlet line 28, respectively. Their function and operation will be explained below in the discussion of the operation of the invention.

The operating procedure for the invention is uncomplicated, can be conducted by a single person, and can be conducted by anyone having rather minimal qualifications; the operator does not have to be a qualified pumper operator as would be the case if the ordinary station pumper were used to conduct pressure tests.

Initially, hoses are laid out in a line. The sections may be tested individually or, as is more conventional, the sections are connected together so long as a single line is not more than 300 feet long. Ordinarily, only one 300 foot section will be tested at a time and the section is connected to threaded outlet 32, as was previously explained. On the other hand, several lines could be tested simultaneously simply by mounting a manifold (not shown) on threaded outlet 32 and then connecting 300 foot sections of hose to be tested to the outlet ports of the manifold. Next, a vent cap 54 is attached to the end of each hose line or hose lines being tested. Or, a conventional fire hose nozzle (not shown) could be used in place of the vent cap 54. Then, the end of each coupling shank between sections of hose making up the 300 foot section being tested should be marked with a chalk or soft pencil so that, during the pressure test, any slippage of each coupling may be readily determined.

With the inlet connection 30 being connected to a conventional water tap or other supply of water, as explained previously, control valves 36 and 40 are opened and the water supply is turned on. The hose is then readily filled through first bypass line 34, without need of going through pump 18. Once the hose is filled, first control valve 36 is turned off and it stays closed for the remainder of the test procedure in order to avoid test pressure from entering the water supply system, by backflowing through inlet connection 30.

Second control valve 40 remains open and the electric motor for pump 18 is started by appropriate operation of switch 22. Thereafter, air is bled from the system by opening the air vent cap 54 and by bleeding air from bleed valve 52 as pressure is building within the system. This ensures that all air is bled out of the hose and the system. Once air is bled from the hose and system, pressure will continue to build as will be noted by observation of the pressure gauge 46. Of course, the maximum level of pressure will be determined by the relief valve 44. In the preferred embodiment, relief valve 44 is spring loaded and may require some adjustment, initially, in order to hold test pressure at the desired pressure level.

Once the desired pressure level is reached, operation of pump 18 is terminated by shutting off motor 16. The hydrostatic pressure test begins at this time. If during the time of the test (e.g., 5 minutes) the pressure level drops, the motor 16 may be turned on again and pressure is then built back up to the initial required pressure. Then, the motor switch is turned off and the test is continued for the required period of time.

The function and operation of check valves 56 and 58 may now be explained. In the preferred embodiment, each check valve has a rating of about 400 PSI. The purpose of check valve 58 is to hold test pressure constant during the test. If pressure drops, as just explained, this usually means that check valve 58 has not seated itself properly or the hose has a leak. When motor 16 is turned on to operate pump 18 to restore the test pressure, usually this is sufficient to properly seat check valve 58 so that the test may proceed. The function of check valve 56 is to prevent test pressure from reversing through the line 26 and entering inlet 30. Should test pressure reach that point, and if an ordinary garden hose is used to connect inlet 30 to an ordinary water tap, then the garden hose (not shown) might burst. In any event, check valve 56 prevents such return flow in the event of improper seating or failure of check valve 58, with subsequent backflow through bypass line 42 and/or inadvertent continued running of pump 18 during a test procedure.

Once the test is completed, the incoming water supply through inlet connection 30 may be stopped by turning off control valve 40. Then, bleed valve 52 is opened to relieve system pressure. Since the test is hydrostatic in nature, only a very small quantity of water needs to be bled from valve 52 to reduce pressure to atmospheric pressure. Normally, only a cupful or less of water needs to be drained. Once system pressure is released, the hose or hoses having been tested may be drained by cracking the air vent cap 54 or by cracking the fire nozzle, if this is used in place of the air vent cap 54. The hose or hoses may then be disconnected from the test apparatus 10.

Ordinarily, second control valve 40 is left open during the test procedure. However, once test pressure is reached and the test pressure holding period begins, control valve 40 may be closed, if desired. In any event, when the hose or hoses just tested are disconnected and a new hose or hoses are connected to test apparatus 10, there is no need to disconnect the test apparatus from the water supply because control valve 40, as well as control valve 36, are closed to prevent entry of tap water into the system during the changeover.

The invention may be embodied in other specific forms without departing from the spirit or central characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. Hydrostatic test apparatus for pressure testing a vessel such as a length of hose or the like, said test apparatus comprising: means including a first fluid conduit means for so connecting a vessel being tested for leaks to a source of hydraulic fluid that said vessel can be filled with hydraulic fluid at the pressure available at said fluid source, said first conduit means having an inlet and an outlet to which said source of fluid and the vessel being tested are respectively adapted to be connected; means for increasing the pressure on the hydraulic fluid in said vessel after it has been filled with said hydraulic fluid as aforesaid, said means for increasing the pressure on said hydraulic fluid including a second fluid conduit means connected in parallel with said first conduit means and a motor driven pump in said second fluid conduit means for increasing the pressure on hydraulic fluid flowing through said second conduit means, said pump being the only pumping means in said apparatus; first and second manually adjustable valve means in said first fluid conduit means which can be opened to effect a flow of the hydraulic fluid through the first conduit means and fill the vessel being tested and then respectively closed and opened to divert all of the hydraulic fluid through the second conduit means and, with said pump running, increase the pressure on the hydraulic fluid in the vessel as aforesaid; means for limiting the pressure exerted on said hydraulic fluid to a selected level, said last-mentioned means comprising a third conduit means connected in parallel with the second conduit means and across the inlet and outlet of said pump and a pressure responsive valve means for diverting hydraulic fluid from said second conduit means on the outlet side of the pump through said third conduit means to said second conduit means on the inlet side of the pump as necessary to keep the pressure on the hydraulic fluid in the vessel being tested from exceeding the selected level, said valve being adjustable to alter the pressure at which fluid is diverted through said third conduit means and, therefore, the pressure to which the fluid in the vessel being tested can be raised; and check valve means in said second conduit means on the downstream side of said pressure responsive valve means for maintaining the pressure on the hydraulic liquid in the vessel being tested at the selected level in the absence of leaks in said vessel by preventing a backflow of the hydraulic fluid through the second and third conduit means.

2. The hydrostatic test apparatus as claimed in claim 1, further comprising a base supporting plate for said apparatus and handle means on said base plate for manually carrying said apparatus.

3. The hydrostatic test apparatus as claimed in claim 1, wherein said relief valve means comprise an adjustable relief valve which may be set to relieve pressure in said outlet line means within a predetermined pressure range of from 200 PSI to 500 PSI.

4. The hydrostatic test apparatus as claimed in claim 1, wherein said relief valve means comprise an adjustable relief valve which may be set to relieve pressure in said outlet line means within a predetermined pressure range of from 50 PSI to 200 PSI.

5. The hydrostatic test apparatus as claimed in claim 1, further comprising means for venting additional air from the test apparatus and for draining hydraulic fluid from said vessel at the conclusion of a test, said last-mentioned means comprising vent means adapted to be attached to an end of the vessel being tested opposite that end of the vessel which is adapted to be connected to said first conduit means.

6. Hydrostatic test apparatus as defined in claim 1 which includes means for evacuating compressible fluids from said first, second, and third conduit means and the vessel being tested before the latter is filled with hydraulic fluid as aforesaid and for bleeding hydraulic fluid from said second conduit means to reduce the pressure on the hydraulic fluid in said vessel at the end of a test, said last-mentioned means comprising a vent communicating with said second conduit means at the highest point to which said hydraulic fluid rises in said apparatus and on the downstream sides of said first valve means and of said check valve means.

7. Hydrostatic test apparatus as defined in claim 1 which has means for protecting the components of the apparatus on the upstream side of the third conduit means and the connections to said test apparatus from the source of hydraulic fluid from damage, said last-mentioned means comprising check valve means so interposed in said second conduit means upstream from the outlet of said third conduit means as to prevent high pressure hydraulic fluid diverted into said third conduit means from said second conduit means from flowing back through said second conduit means into said first conduit means.

* * * * *